(12) United States Patent
Duan et al.

(10) Patent No.: US 11,904,727 B2
(45) Date of Patent: Feb. 20, 2024

(54) BATTERY THERMAL MANAGEMENT VIA CURRENT CONTROL

(71) Applicant: Ford Global Technologies, LLC, Dearborn, MI (US)

(72) Inventors: Xiaohong Nina Duan, Canton, MI (US); Yanan Zhao, Ann Arbor, MI (US); Ming Lang Kuang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 204 days.

(21) Appl. No.: 17/191,224

(22) Filed: Mar. 3, 2021

(65) Prior Publication Data

US 2022/0281352 A1    Sep. 8, 2022

(51) Int. Cl.
| | |
|---|---|
| B60L 58/26 | (2019.01) |
| B60K 6/42 | (2007.10) |
| B60L 15/20 | (2006.01) |
| H02M 3/10 | (2006.01) |
| B60W 20/00 | (2016.01) |
| H02J 7/14 | (2006.01) |
| B60W 10/26 | (2006.01) |

(52) U.S. Cl.
CPC ........... *B60L 58/26* (2019.02); *B60K 6/42* (2013.01); *B60L 15/20* (2013.01); *B60W 10/26* (2013.01); *B60W 20/00* (2013.01); *H02J 7/1423* (2013.01); *H02M 3/10* (2013.01)

(58) Field of Classification Search
CPC ........... B60L 58/26; B60L 15/20; B60K 6/42; B60W 10/26; B60W 20/00; H02J 7/1423; H02J 7/007194; H02J 7/342; H02J 7/00309; H02M 3/10; Y02E 60/10; Y02T 10/62; Y02T 10/70; Y02T 10/7072; Y02T 10/72; Y02T 90/16
USPC ........................................................ 429/120
See application file for complete search history.

(56) References Cited

U.S. PATENT DOCUMENTS

| | | | |
|---|---|---|---|
| 6,430,482 B1 | 8/2002 | Wakashiro et al. | |
| 8,525,480 B2 | 9/2013 | Anderson | |
| 2005/0029867 A1 | 2/2005 | Wood | |
| 2009/0179616 A1* | 7/2009 | Ichikawa | H02J 7/1423 320/134 |
| 2017/0129359 A1* | 5/2017 | Dunlap | B60L 53/14 |
| 2019/0097441 A1* | 3/2019 | Chen | H02J 7/0068 |

FOREIGN PATENT DOCUMENTS

JP            4337848 B2    7/2009

* cited by examiner

*Primary Examiner* — Yi-Kai Wang
(74) *Attorney, Agent, or Firm* — David B. Kelley; Brooks Kushman P.C.

(57) ABSTRACT

A power system includes a primary bus connected to a traction battery, a secondary bus connected to an auxiliary battery, a power converter between the traction and auxiliary batteries, and a controller. The controller commands the power converter to increase a magnitude of current output to the secondary bus when an amount of charge current received by the traction battery exceeds a first amount threshold and commands the power converter to decrease the magnitude when an amount of charge current received by the auxiliary battery exceeds a second amount threshold.

14 Claims, 6 Drawing Sheets

BATTERY THERMAL MANAGEMENT VIA CURRENT CONTROL

TECHNICAL FIELD

The present disclosure relates to thermal management of vehicle power systems.

BACKGROUND

Certain vehicles may be propelled via a traction battery and one or more electric machines. Operation of such components may generate heat.

SUMMARY

One embodiment comprises a hybrid vehicle. The hybrid vehicle includes a direct current to direct current electrical converter, an internal combustion engine, and a controller. The DC/DC converter may be configured to selectively permit electrical communication of either a predetermined first current value and a second predetermined current value between a first electrical bus network and a second electrical bus network. The first electrical bus network may be in electrical communication with a generator. The internal combustion engine may be in mechanical communication with the generator such that torque produced by the engine is converted into electrical energy and supplied to the first electrical bus network. The controller may be in electrical communication with the DC/DC converter. The controller may be configured to change between the first current value and the second current value in response to one of the predicted temperature value of the first battery exceeding a predetermined temperature threshold, the electrical current exposure value of the first battery exceeding a predetermined third current value, and an electrical current exposure value of the first battery exceeding a predetermined temporal value.

A second embodiment comprises a method for managing vehicle thermal properties. The method includes monitoring the temperature of a primary battery and a primary battery charging/discharging current, and in response to a predicted temperature value of the primary battery surpassing a predetermined threshold value, increasing a supplementary charging/discharging current value such that the predicted temperature decreases below the predetermined threshold. The primary battery charging/discharging current value may be comprised of a supplementary charging/discharging current value received and selectively regulated by a DC/DC converter. The DC/DC converter may be configured to provide a secondary current to a secondary battery.

A third embodiment comprises a method. The method includes operating a DC/DC converter electrically connected between a traction battery and a secondary battery according to a temperature of the traction battery such that when the temperature is less than a temperature threshold, discharge current from a first battery to a second battery through the DC/DC converter is less than when the temperature is greater than the temperature threshold. The method may include operating the DC/DC converter according to an amount of current discharged by the traction battery such that when the amount is greater than an amount threshold, discharge current from the first battery to the second battery through the DC/DC converter is less than when the temperature is greater than the temperature threshold. The method may also include operating the DC/DC converter according to an amount of current discharged by the second battery such that when the amount is greater than an amount threshold, discharge current from the first battery to the secondary battery through the DC/DC converter is less than when the temperature is greater than the temperature threshold. The temperature threshold may be based on historical temperature data of the traction battery.

DETAILED DESCRIPTION

Figure 1:
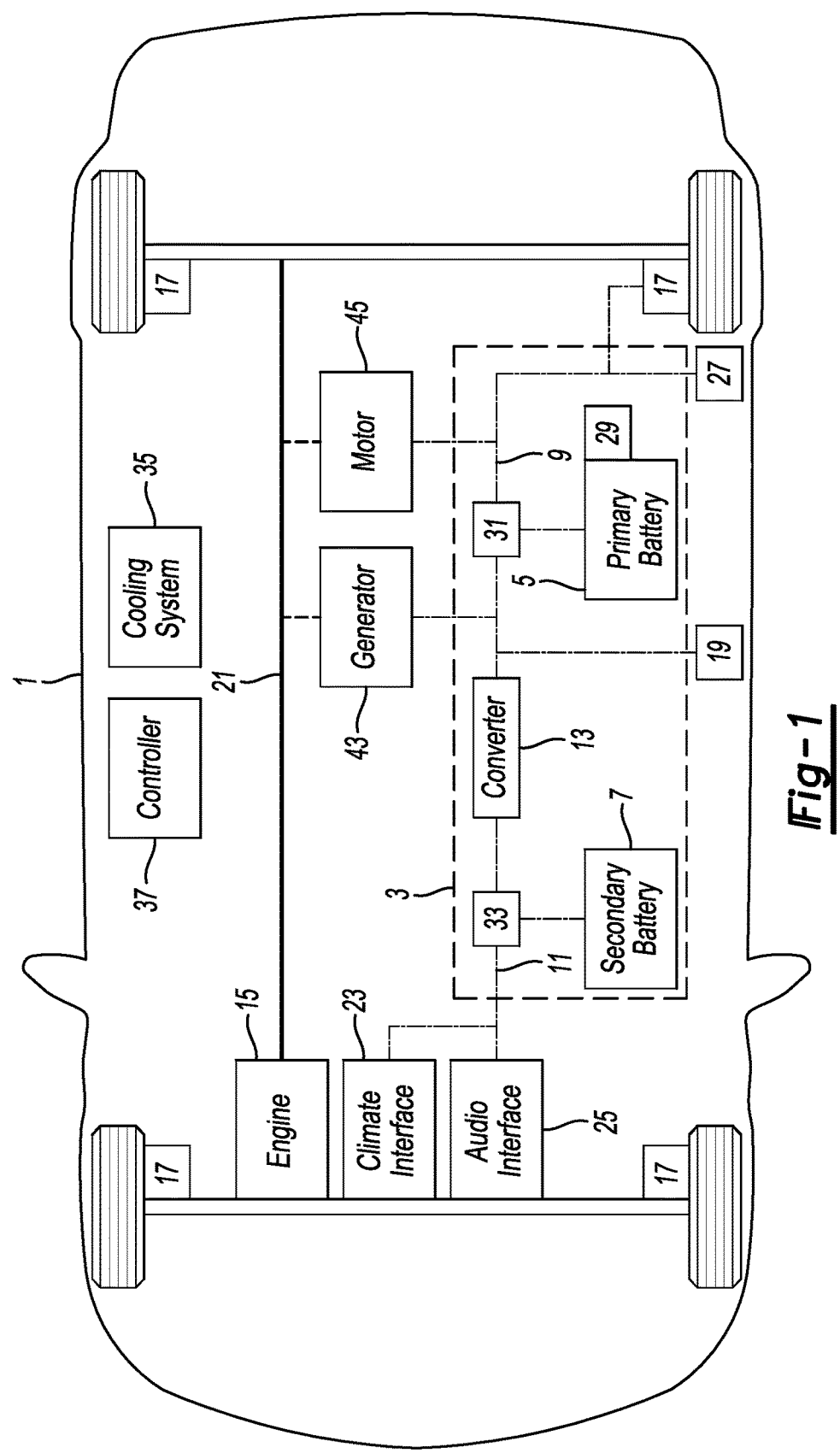
FIG. 1 depicts an embodiment within a vehicle.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Certain vehicles may operate with a voltage under 60V, usually at 48V. A 48V battery pack may provide power to or capture power from a 48V bus for propulsion assist or energy storage. It may also, along with a low voltage (LV) battery, support power to electrical components and accessories (e.g., control modules, lighting, communications, and entertainment devices) connected on a LV bus. In order to supply power from the 48V battery pack to the LV components or to recharge the LV battery, a DC/DC converter or a plurality of DC/DC converters can be used to down convert the 48V voltage to an appropriate lower voltage.

The charge/discharge power limit of a high voltage (HV) battery may be affected by the SOC level and temperature of the HV battery. When battery temperature is lower or higher than a predefined thermal limit, both battery charge and discharge power capability may become lower. When battery charge power capability is lower, the vehicle regenerative braking capability may be limited during a vehicle deceleration event. When discharge power capability is lower, the capability of driving assist from the electric motor may be limited. Both of these situations may affect vehicle fuel economy.

For a mild hybrid electric vehicle (mHEV), its HV battery pack voltage may be much lower than that used in full hybrid electric vehicles (FHEVs), plug-in hybrid electric vehicles (PHEVs), and battery electric vehicles (BEVs), and this may make its per-cell root mean square current (IRMS) higher for the same per-cell root mean square power. Higher per-cell IRMS may result in higher per-cell heat generation. As a result, mHEV 48V battery temperature may increase faster during vehicle operation than other types of electric vehicles (EVs), especially during regenerative braking. This disclosure relates to these and other possible issues.

Generally speaking, a vehicle may use an electric power source for propulsion. For example, the vehicle may include a traction battery used for propulsion of the vehicle. Additionally, the vehicle may be partially propelled by an internal combustion power source such as an internal combustion engine. In embodiments containing both electrical and internal combustion power sources, the internal combustion power source may be in electrical communication with the electrical power source, such that power generated by the internal combustion power source may be used to charge the electrical power source. In such embodiments, the internal combustion power source may use electrical power components to facilitate conversion of combustion power to electrical power. For example, the internal combustion power source may be in mechanical communication with a generator. The generator may be in electrical communication with the electrical power source. In this configuration, the internal combustion power source may use combustion to operate the generator, thus charging the electrical power source. The vehicle may comprise other electrical power components. For example, the vehicle may comprise an additional electric machine. This electric machine may be configured to add negative torque to the vehicle during operation.

The vehicle may have a plurality of energy storage power sources. For example, the vehicle may include a traction battery configured to provide one of electrical current, voltage, and power for vehicle propulsion in which the one of the current, voltage, and power value is a first predetermined value. In addition to the traction battery, the vehicle may include a supplementary battery configured to provide one of electrical current, voltage, and power to a vehicle, wherein the one of the current, voltage, and power value is a second predetermined value distinct from the first predetermined value. Energy from the supplementary battery may be used for vehicle needs outside of propulsion. Alternatively, the supplementary battery may be used as a backup, or in addition to the traction battery for propulsion.

The vehicle may have a vehicle power network. The vehicle power network may include a plurality of electrical bus networks. For example, the power network may include a high-voltage bus network and a low-voltage bus network. In such embodiments, the vehicle power network may include a high-voltage battery in direct electrical communication with the high-voltage bus network. Similarly, the power network may include a low-voltage battery in direct electrical communication with the low-voltage bus network. The power network may further comprise a converter between the high-voltage and low-voltage bus networks. The converter may allow and regulate electrical communication between the high-voltage and low-voltage bus networks. The converter may be a DC/DC converter. As such, the converter may decrease the electrical potential parameter of electricity traversing from the high-voltage bus network to the low-voltage bus network. Further, the converter may increase the electrical potential parameter of electricity traversing from the low-voltage bus network to the high-voltage bus network. The converter may be configured to selectively allow and inhibit electrical communication between the plurality of electrical networks. In alternate embodiments, the power network may comprise alternate converters that may change other electrical parameters of electricity traversing between the bus networks. Still in other embodiments, the power network may comprise a plurality of converters for the regulation of electrical communication between the electrical bus networks. Even further, the converter may allow a plurality of electrical communication values. For example, the converter may be configured to allow a plurality of electrical current values. In some embodiments, the plurality may be comprised of discrete values. In alternate embodiments, the converter may be comprised of a range of analog values.

The power network may have various sensors. For example, the power network may have a sensor to determine an electrical parameter value of the power network. For example, the power network may have an electrical potential, electrical current, or electrical power sensor. Additionally, the power network may have a thermal sensor. The thermal sensor may be configured to determine a temperature value of one of the electrical power sources, and the converter. The power network may have a plurality of various sensors. In embodiments having mechanical power sources, the power network may have sensors to determine various engine parameters, such as rotational speed, torque, range, etc.

The vehicle may have a cooling system. The cooling system may be configured to provide thermal regulation to the primary power source. For example, the cooling system may have a cooling plate in thermal communication with a vehicle traction battery, wherein the cooling system is selectively operated to reduce the traction battery temperature in response to the traction battery reaching a predetermined temperature threshold. Alternatively, the cooling system may be configured to provide thermal regulation to an additional or alternate electrical power source. Similarly, the cooling system may be configured to provide thermal regulation to an additional or alternate converter.

The vehicle may provide various ways to charge the plurality of electrical energy power sources. The vehicle may have an interface for stationary charging. For example, the vehicle may have a port to connect a cable from a stationary charging facility to provide electrical power to the vehicle. The interface may be in electrical communication with either of the high-voltage and low-voltage bus networks. Additionally, the interface may be in electrical communication with the converter.

The vehicle may use a mechanical power source for charging the plurality of electrical energy sources. For example, the power network may include an internal combustion engine. Further, the power network may include a generator. The generator may be in mechanical communication with the internal combustion engine, and in electrical communication with one of the primary electrical power source, the secondary electrical power source, and the converter, such that the generator is configured to produce electricity from the power gathered from the mechanical communication with the internal combustion engine. Electricity gathered from the internal combustion engine may be converted by the converter such that its electrical parameters are suited for either of the high-voltage and low-voltage electrical bus networks. Alternatively, the generator may be configured to produce electricity having electrical parameter suited for either of the high-voltage and low-voltage electrical bus networks.

The vehicle may use energy recuperation for charging the plurality of electrical energy sources. For example, the vehicle may have a regenerative braking function. The regenerative braking system may recuperate the vehicle's kinetic energy during vehicle deceleration to charge the HV battery, that is, be in electrical communication with one of the primary electrical power source, the secondary electrical power source, and the converter such that the regenerative braking system is configured to produce electricity from kinetic energy gathered from the mechanical communication with the vehicle wheels. Electricity gathered from the regenerative braking system may be converted by the converter such that its electrical parameters are suited for either of the high-voltage and low-voltage electrical bus networks. Alternatively, the regenerative braking system may be configured to produce electricity having electrical parameters suited for either of the high-voltage and low-voltage electrical bus networks.

The vehicle may have various way to discharge the plurality of electrical power sources. The vehicle may discharge the battery in response to torque demands. For example, the vehicle may request torque to accelerate, decelerate, and maintain velocity of the vehicle. The vehicle may use electrical power from one of the plurality of electrical power sources to meet the requested torque demand.

The vehicle may discharge the battery in response to cabin demands. For example, the driver or passenger may request to use onboard audio. Alternatively, one of the driver and passenger may request to operate the vehicle climate control. As such, the vehicle may use electrical power from one of the plurality of the electrical power sources to meet the requested cabin demand.

The vehicle may discharge the battery in response to alternate power demands. For example, the vehicle may be used to provide electrical power to one of a facility and another vehicle. Use of the electrical power may be temporary. As such, the vehicle may use electrical power from one of the plurality of the electrical power source to meet the requested alternate power request.

The vehicle may have a controller. The controller may in communication with the primary vehicle battery, the secondary vehicle battery, and the converter. Additionally, the controller may be in communication with sensors, the mechanical power source, the interface, and the cooling system.

The controller may have a cooling algorithm. The cooling algorithm may be used to estimate the effect the cooling system may have on one of a vehicle battery and a converter. For example, the controller may monitor the thermal differentiation capacity of the cooling system, and calculate the possible cooling effect the system would have on a vehicle battery. The possible cooling effect the system would have may be considered the cooling capability. The cooling algorithm may have a cooling schedule. The cooling schedule may produce cooling predicted values based on at least one of the battery temperature, battery charge rate, battery discharge rate, converter temperature, converter charge rate, converter discharge rate, electrical parameters of the power network, coolant temperature, coolant thermal capacity, and cooling system usage. Predicted values may be updated by monitoring historical data.

The controller may have a thermal algorithm. The thermal algorithm may be used to estimate the present temperature value of a vehicle battery. The thermal algorithm may use the determination of the thermal sensors to estimate the present temperature value of the vehicle battery. Alternatively, the thermal algorithm may use historical data to estimate the present temperature value of the vehicle battery. For example, the thermal algorithm may use the amount of time a battery was exposed to an electrical current, power, or potential to estimate the battery temperature. The thermal algorithm may be used to estimate a future battery temperature. For example, the thermal algorithm may use a present temperature value of a vehicle battery, the electrical current exposed to the battery, the battery cooling system capability, and the amount of time the vehicle battery has been exposed to that temperature to estimate a future battery temperature value. Additionally, the thermal algorithm may use temperature differentiation of historical data to estimate a future battery temperature value. The thermal algorithm may include a thermal schedule. The thermal schedule may produce thermal predicted values based on one of the battery temperature, battery charge rate, battery discharge rate, converter temperature, converter charge rate, converter discharge rate, and electrical parameters of the power network. Additionally, the thermal algorithm may produce thermal predicted values based in part on cooling predicted values produced in the cooling algorithm.

The controller may have a charge algorithm. The charge algorithm may be used to selectively direct electricity between the high-voltage and low-voltage bus networks. In an embodiment wherein at least one of a generator, charge interface, and energy recycling system is configured to provide electricity to the high voltage bus network, the controller may monitor the temperature, charge state, and electrical parameters of a primary battery. In response to the battery having a predicted temperature value greater than a predetermined temperature threshold, the controller may instruct the converter to allow electricity to flow from the high-voltage bus network to the low-voltage bus network. As such, the predicted temperature of the vehicle battery may decrease. Similarly, in response to the electrical parameters of the high-voltage bus network exceeding one of an electrical current, voltage, and power threshold, the controller may instruct the converter to allow electricity to flow from the high-voltage bus network to the low-voltage bus network. For example, if stationary charging is providing more electrical current than a predetermined charge threshold suited for the primary battery, the controller may operate the converter to allow current to flow and charge the secondary battery. Even further, in response to the electrical parameter of the primary battery reaching a predetermined state threshold, the controller may instruct the converter to allow electricity to flow from the high-voltage bus network to the low-voltage bus network. For example, in response to the primary battery reaching a substantially charged threshold, the controller may instruct the converter to operate. In response to a vehicle load requesting a power value that is beyond a predetermined threshold, or that is in range of the power being provided through the converter, the controller may instruct the converter to operate.

The controller may have a discharge algorithm. The discharge algorithm may be used to selectively direct electricity between the high-voltage and low-voltage bus networks. In one embodiment, the vehicle uses electricity from one of the high-voltage and low voltage bus networks to supply power for at least one of a vehicle torque demand, a vehicle cabin demand, and alternate power demands. An example of a torque demand is acceleration of the vehicle requested by the driver. An example of a cabin demand may be an audio or climate control demand. An example of an alternate power demand may be using the vehicle to power a facility or another vehicle. In response to the primary battery having a predicted temperature value greater than a predetermined temperature threshold, the controller may instruct the converter to allow electricity to flow from the secondary battery to fulfill one of the torque demand, cabin demand, and alternate power demand. As such, the predicted temperature of the primary battery may decrease. Similarly, in response to the electrical parameters of the high-voltage bus network exceeding one of an electrical current, voltage, and power threshold, the controller may instruct the converter to allow electricity to flow from the low-voltage bus network to the high-voltage bus network. For example, if providing alternate power to a facility or another vehicle requires more electrical current than a predetermined current suitable for the primary battery, the controller may operate the converter to allow current to flow from the secondary battery to meet the current demand.

The controller may be configured to monitor a vehicle electrical energy demand value. The vehicle electrical energy demand value may be a value indicative of the electrical current requested by electrical components in the vehicle. In one embodiment, a vehicle electronic system may request energy from the vehicle electrical system. The vehicle-electronic system may be in electrical communication with the second electrical bus. In accordance with the charge algorithm the controller may be programmed to command the converter to allow a portion of the requested energy to be supplied to the secondary battery. Additionally, or alternatively, a vehicle motor may request energy from the vehicle electrical system. The vehicle motor may be in electrical communication with the first electrical bus. In accordance with the discharge algorithm, the controller may be programmed to command the converter to allow a portion of the requested energy to be provided by the secondary battery, via increasing the electrical current allowed from the second electrical bus to the first electrical bus.

The controller may have a temperature schedule. The temperature schedule may have temperature entries. The entries may be based in part on one of the predetermined predicted temperatures of a particular vehicle battery, historical data of the vehicle battery, historical data of the temperature of the vehicle battery, historical data of the temperature change and rate of change, and performance of the cooling system, including performance and rate of performance of cooling capacity. Entries in the temperature schedule may be dynamically edited and updated.

The controller may comprise a thermal prediction routine. The thermal prediction routine may be used to predict a temperature of a battery. The thermal prediction routine may be in communication with the cooling system, such that the remaining capacity of the cooling system is provided to the thermal prediction routine. Then, the thermal prediction routine may be provided the predicted electrical power exposed to the battery. Using at least these two factors, the thermal prediction routine may calculate the temperature of the battery. If the capacity of cooling system is capable of keeping the battery below a threshold, the vehicle may continue to run as normal. However, if the thermal prediction routine predicts that the temperature of the battery will exceed a predetermined temperature threshold, then the controller may be configured to activate one of the charge and discharge algorithms.

During charge, in normal operation when the HV battery expected charging current is not larger than a limit, the current flow from the first bus to second bus through the DC/DC converter is determined via the second bus load and the charging/discharging need of the second battery. When the HV battery expected charging current is larger than a charging current limit, the DC/DC converter current flow from the first bus to the second bus is determined by the second battery's capability of accepting charge. In the condition that the second battery is able to accept the extra current, which is defined as current generated by the generator minus the charging current limit, the DC/DC converter will pass the extra current from the first bus to second bus. In the condition that the second battery is not be able to accept the extra current minus the current of the second bus's loads, the DC/DC converter will pass current of the second bus's load current plus the maximum current of the second battery.

During discharge, in the normal operation when the HV battery expected discharging current is not larger than a limit, the DC/DC converter current flow was from the first bus to the second bus, and DC/DC converter current is determined via the second bus load and the charging/discharging need of the second battery. However, if the HV battery expected discharging current is larger than a discharge limit, the DC/DC converter current flow will be from the second bus to the first bus. The amount of DC/DC converter current is determined by both the second battery's discharge capability and the first bus's extra discharging current, which is defined as the difference between the first bus required current and the discharge limit. Under the condition that the second battery discharge capability is larger than the extra current plus the current load of the second bus, the DC/DC converter will pass the extra current from the second bus to the first bus. Under the condition that discharge capability of the second battery is less than the extra current plus the current load of the second bus, the DC/DC converter will pass the current equal to the second battery's maximum discharging current minus the second bus's current load. The current flow direction is from the second bus to the first bus.

FIG. 1 depicts an embodiment comprising a vehicle 1. The vehicle 1 has a power network 3. The power network 3 includes a high-voltage bus network 9, and a low-voltage bus network 11. The high-voltage bus network 9 includes a primary battery 5. The low-voltage bus network 11 includes a secondary battery 7. The power network 3 further includes a converter 13 disposed between the high-voltage bus network 9 and the low-voltage bus network 11, such that the converter 13 may selectively control electrical communication between the electrical bus networks. The power network 3 is in electrical communication with a generator 43. The generator 43 is in mechanical communication with an internal combustion engine 15. As such, the internal combustion engine 15 may provide power to the power network 3 via the generator 43. The power network 3 is in electrical communication with a regenerative braking system, such that kinetic energy collected from the vehicle may be used to charged one of the primary battery 5, and the secondary battery 7 via the regenerative braking system. The vehicle 1 has a stationary charging interface 19 in electrical communication with the power network 3, the interface 19 is configured to allow stationary charging to one of the primary battery 5, and the secondary battery 7 via the power network 3. The vehicle 1 has a drivetrain 21 in communication with the power network 3 such that one of the primary battery 5 and the secondary battery 7 may fulfil torque demands of the vehicle. The high-voltage bus network 9 may provide electrical current to the motor 45 to fulfil torque demands. The vehicle 1 has a climate interface 23 and an audio interface 25 such that one of a driver and a passenger may request climate and audio demands. The vehicle 1 has a stationary discharging interface 27 configured to allow one of the primary battery 5 and the secondary battery 7 to provide electricity for an alternate power request. The power network 3 has a temperature sensor 29 in thermal communication with the primary battery 5. The power network 3 has a first electrical parameter sensor 31 configured to determine an electrical parameter of the high-voltage bus network 9. The power network has a second electrical parameter sensor 33 configured to determine an electrical parameter of the low-voltage bus network 11. The vehicle 1 has a cooling system 35 in thermal communication with primary battery 5. The vehicle 1 has a controller 37. The controller 37 is in electrical communication with the primary battery 5, the secondary battery 7, the converter 13, the internal combustion engine 15, the regenerative braking system, the stationary charging interface 19, the drive train 21, the climate interface 23, the audio interface 25, the stationary discharging interface 27, the temperature sensor 29, the first electrical parameter sensor 31, the second electrical parameter sensor 33, and the cooling system 35. The controller 37 has a battery status algorithm 101. charge algorithm 201, and a discharge algorithm 301.

Figure 2:
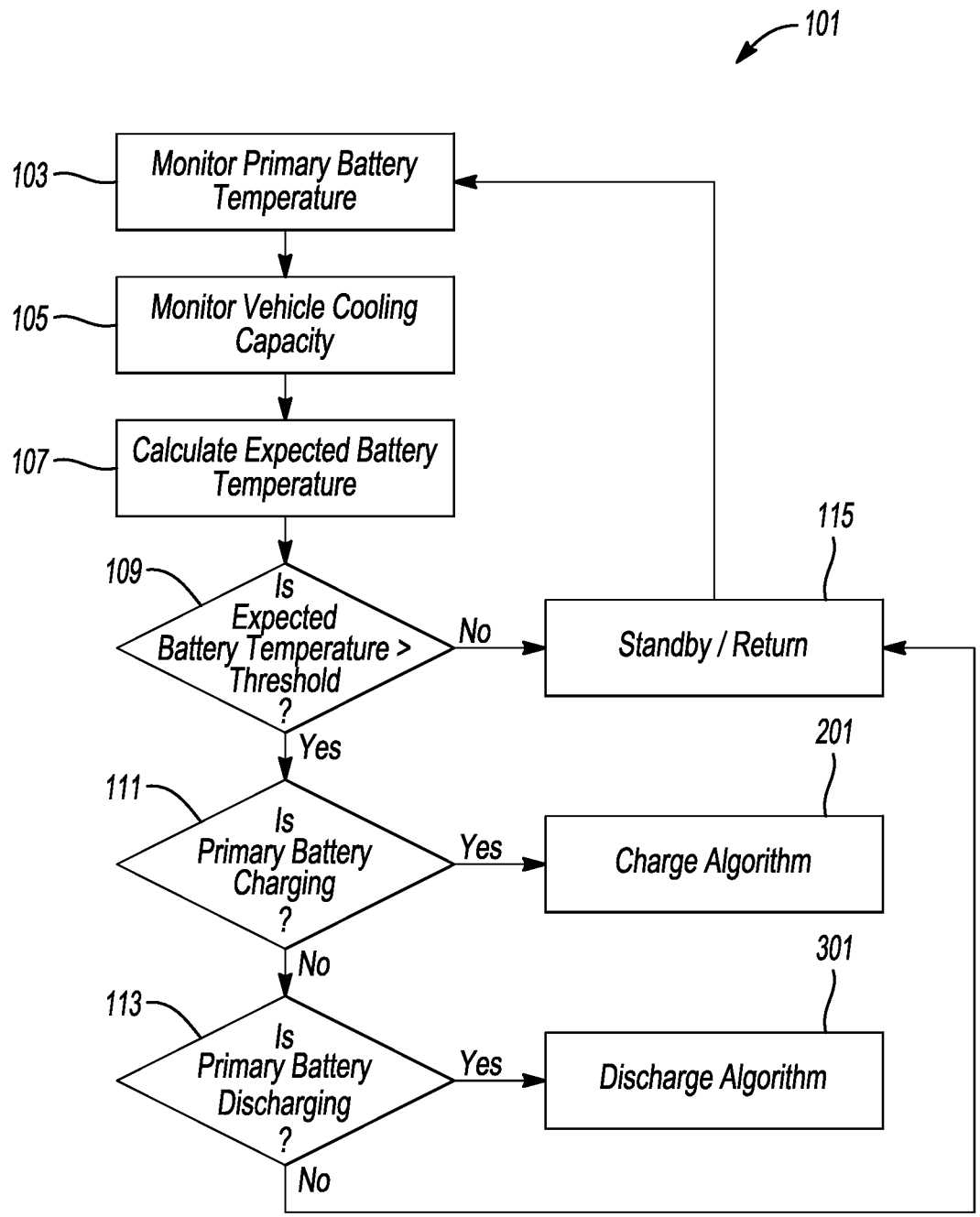
FIG. 2 depicts a primary battery status algorithm.

FIG. 2 depicts the primary battery status algorithm 101. The primary battery status algorithm 101 may serve as a standby setting wherein the predicted primary battery temperature does not exceed a first temperature threshold. The primary battery status algorithm 101 may first monitor the temperature of the primary battery 5 in a monitor battery temperature step 103. Next, the primary battery status algorithm 101 may monitor the remaining cooling capacity of the cooling system 35 in the monitor cooling capacity step 105. Following this, the primary battery status algorithm 101 may calculate the predicted temperature of the primary battery 5 in the calculate predicted battery temperature step 107. If the predicted temperature of the primary battery 5 does not exceed the first temperature threshold, the primary battery status algorithm 101 may return to the monitor battery temperature step 103. If the predicted temperature of the primary battery 5 does exceed the first temperature threshold, the primary battery status algorithm 101 queries if the primary battery 5 is charging in the charging query step 111. If the primary battery 5 is charging, the primary battery status algorithm 101 will move to the charge algorithm 201. If the primary battery 5 is not charging, the primary battery status algorithm will move to the discharging query step 113 which will query if the primary battery 5 is discharging. If the primary battery 5 is discharging, the primary battery status algorithm 101 will move to the discharge algorithm 301. If the primary battery is not discharging, the primary battery status algorithm 101 will move to the monitor battery temperature step 103.

Figure 3:
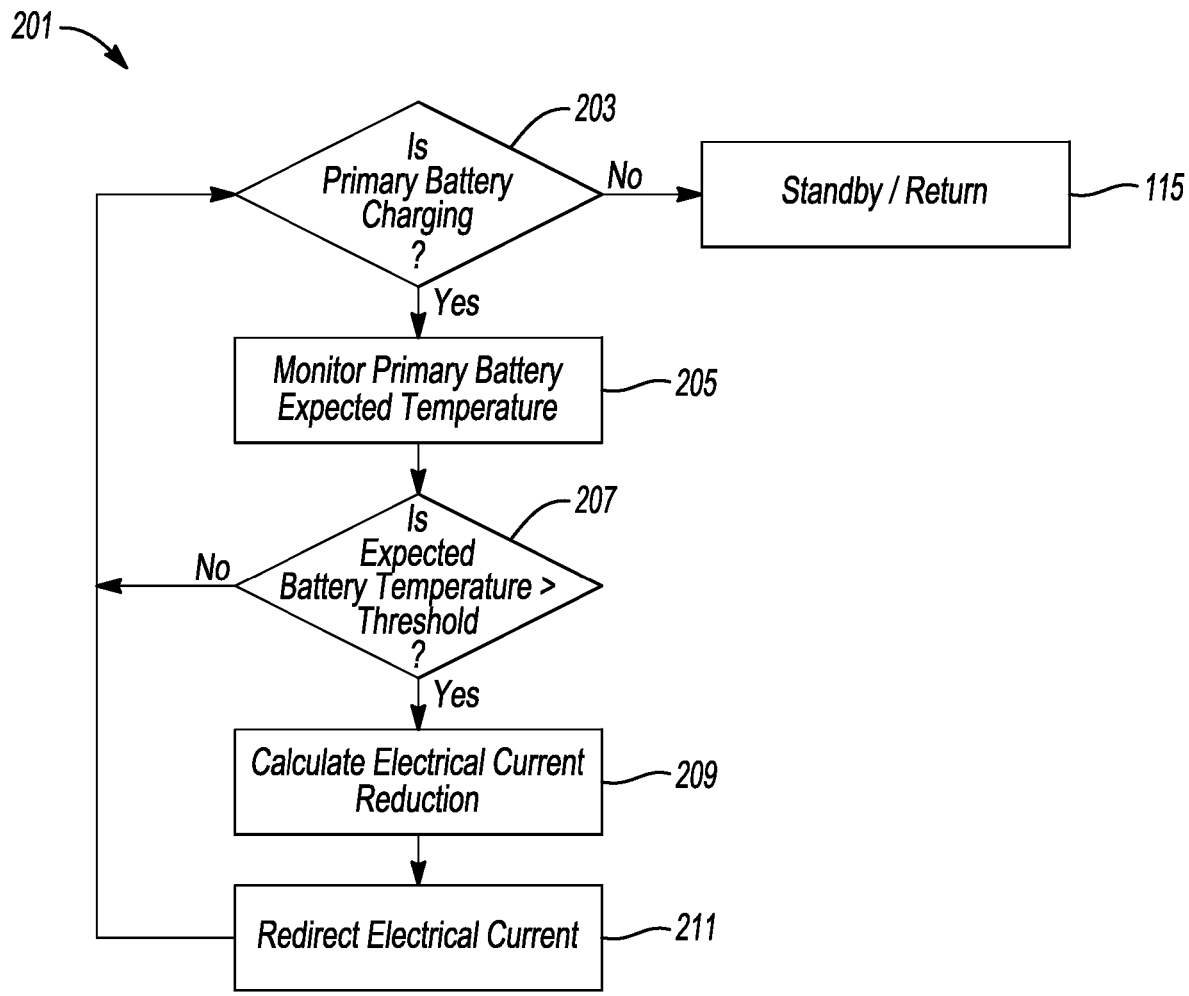
FIG. 3 depicts a charge algorithm.

FIG. 3 depicts the charge algorithm 201. The charge algorithm 201 may start by determining if the primary battery 5 is charging in the intermediate charging query step 203. Further, the charge algorithm 201 will monitor the electrical current flowing to the battery 5. The charge algorithm 201 will then move to the calculate predicted temperature step 205. In the step 205, the controller will use the temperature of the battery and cooling capacity to predict a future temperature value. The controller may further use one of historical data, and electrical current in predicting the future temperature value. Next, the charge algorithm 201 will compare the predicted temperature of the primary battery 5 to the first temperature threshold in the compare predicted battery temperature step 207. If the predicted temperature of the primary battery 5 is less than the first temperature threshold, the charge algorithm 201 will move to the standby return step 115. If the predicted temperature of the primary battery 5 is greater than the first temperature threshold, the charge algorithm 201 will calculate the required reduction of current for desired predicted temperature of the primary battery 5 in the calculate current reduction step 209. Following this, the charge algorithm 201 will redirect the electrical current flowing between the high-voltage bus network 9 and the low-voltage bus network 11 via the converter 13 in the redirect current step 211. Lastly, the charge algorithm 201 will move back to the intermediate charging query step 203.

Figure 4:
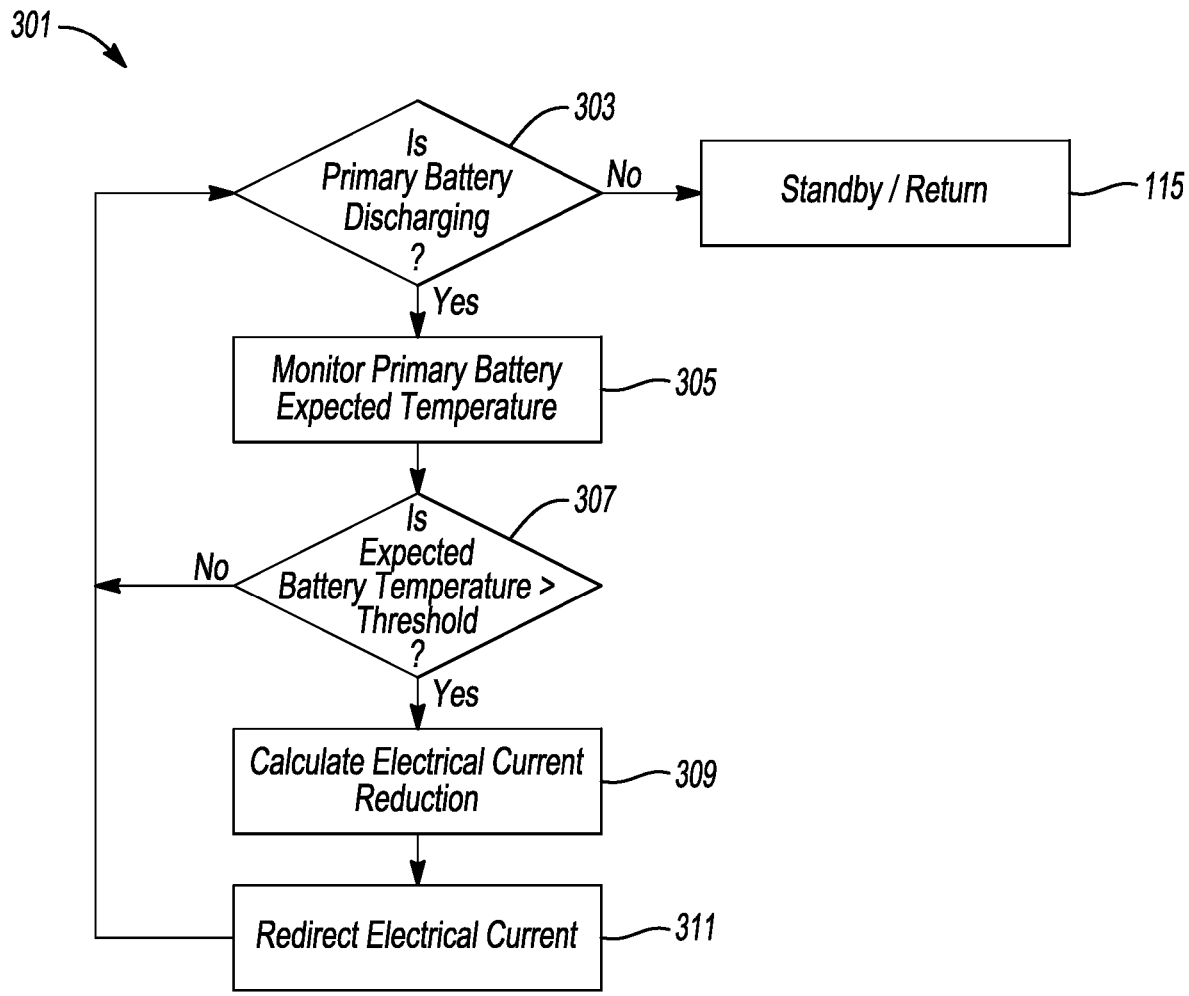
FIG. 4 depicts a discharge algorithm.

FIG. 4 depicts the discharge algorithm 301. The discharge algorithm 301 may start by determining if the primary battery 5 is discharging in the intermediate discharging query step 303. If the primary battery 5 is discharging, the discharge algorithm 301 will move to monitoring the battery present temperature in the monitor predicted battery temperature step 304. Further, the discharge algorithm 301 will monitor the electrical current flowing to the battery 5. The discharge algorithm 301 will then move to the calculate predicted temperature step 305. In the step 305, the controller will use the temperature of the battery and cooling capacity to predict a future temperature value. The controller may further use one of historical data, and electrical current in predicting the future temperature value. Next, the discharge algorithm 301 will compare the predicted temperature of the primary battery 5 to the first temperature threshold in the compare predicted battery temperature step 307. If the predicted temperature of the primary battery 5 is less than the first temperature threshold, the discharge algorithm 301 will move to the standby return step 115. If the predicted temperature of the primary battery 5 is greater than the first temperature threshold, the discharge algorithm 301 will calculate the required reduction of current for desired predicted temperature of the primary battery 5 in the calculate current reduction step 309. Following this, the discharge algorithm 301 will redirect the electrical current flowing between the high-voltage bus network 9 and the low-voltage bus network 11 via the converter 13 in the redirect current step 311. Lastly, the discharge algorithm 301 will move back to the intermediate discharging query step 303.

Figure 5:
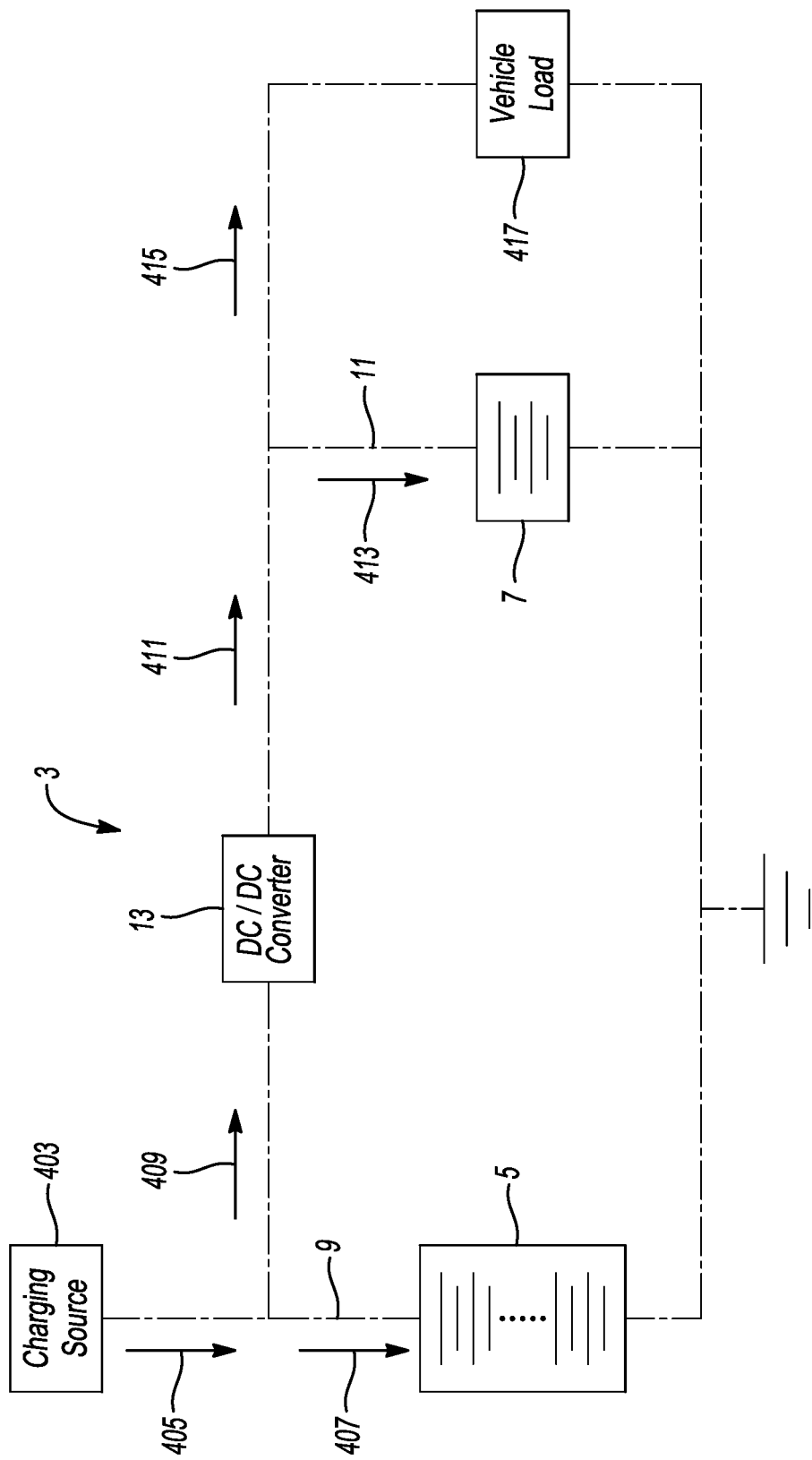
FIG. 5 depicts power network current behavior during charging.

FIG. 5 depicts a portion of the power network's electrical current behavior during charging. During charging, the high-voltage bus network 9 may be in electrical communication with a charging source 403. The charging source 403 may be one of the internal combustion engine 15, regenerative braking system, stationary charging interface 19, and other electrical charging sources. The charging source 403 may provide a total charging current 405 to the high-voltage bus network 9. The total charging current 405 may be divided into a primary battery charging current 407 and a high-volt supplementary current 409. The primary battery charging current 407 may be provided to the primary battery 5. The primary battery charging current 407 may be a current value such as not to increase the temperature of the primary battery 5 beyond a predetermined temperature threshold. The remaining high-voltage supplementary current 409 may be directed to and converted into a low-volt supplementary current 411 by the converter 13. The low-volt supplementary current 411 may travel through the low-voltage bus network 11. The low-volt supplementary current may be divided into a secondary battery charging current 413 used to charge the secondary battery 7, and a load current 415, used to meet the demands of a vehicle load 417.

Figure 6:
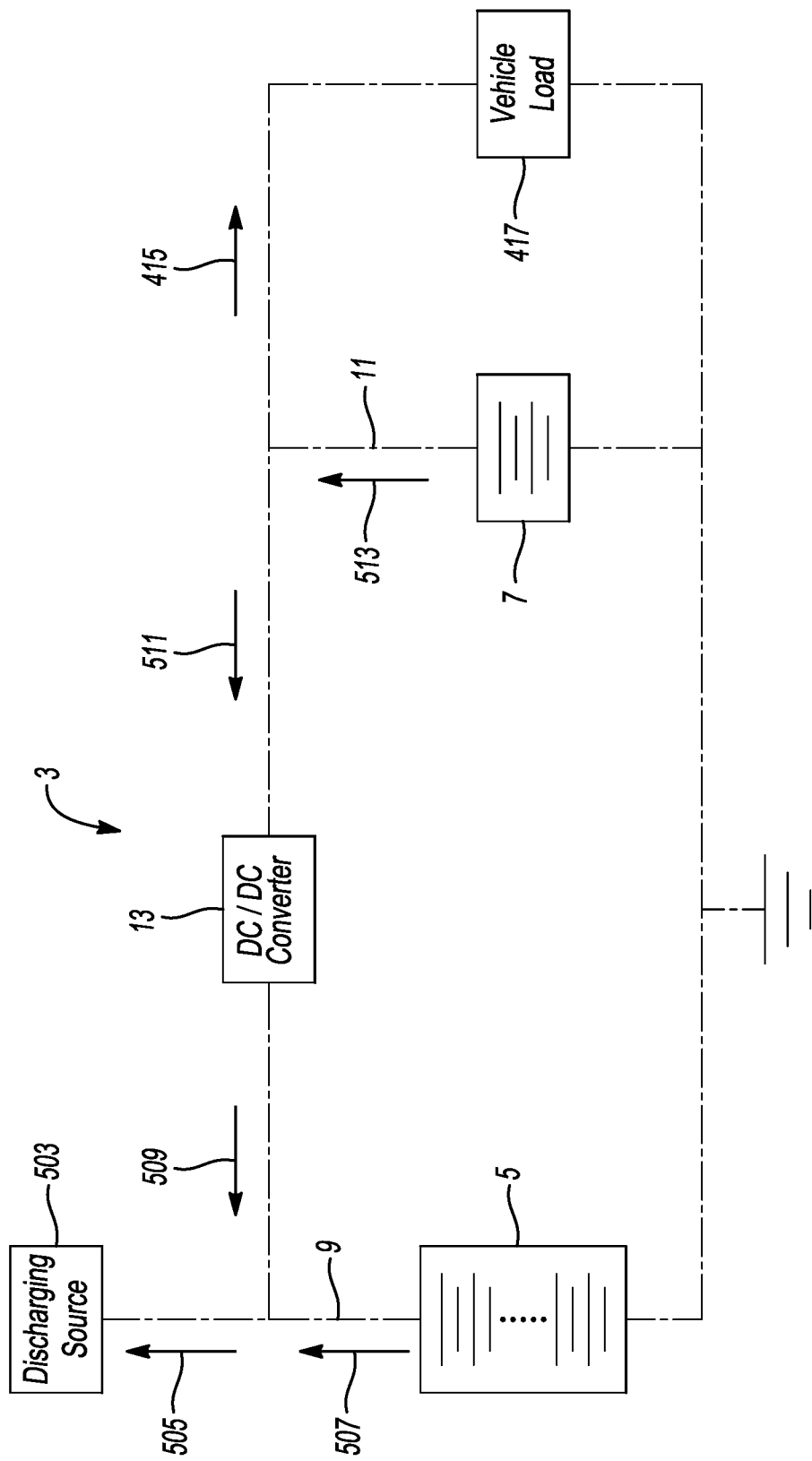
FIG. 6 depicts power network current behavior during discharging.

FIG. 6 depicts a portion of the power network 3 electrical current behavior during discharging. During discharging, the high-voltage bus network 9 may be in electrical communication with a discharging source 503. The discharging source 503 may be one of the drivetrain 21, demands from the climate interface 23, demands from the audio interface 25, the motor 45, the stationary discharging interface 27, and other sources requesting discharging current. The discharging source 503 may receive a total discharging current 505 from the high-voltage bus network 9. The total discharging current 505 may be comprised of a primary battery discharging current 507 and a high-voltage supplementary discharging current 509. The primary battery discharging current 507 may be received from the primary battery 5. The primary battery charging current 507 may be a current value such as not to increase the temperature of the primary battery 5 beyond a predetermined temperature threshold. The remaining high-voltage supplementary discharging current 509 may be received from a converted low-voltage supplementary discharging current 511, of which the current was converted by the converter 13. The low-voltage supplementary discharging current 511 may travel through the low-voltage bus network 11. The low-voltage supplementary current may be comprised of the difference between a secondary battery charging current 513 discharged from secondary battery 7, and a load current 415, used to meet the demands of a vehicle load 417.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a DC/DC converter configured to selectively permit flow of electrical current between a first electrical bus and a second electrical bus, wherein the first electrical bus is in electrical communication with a first battery and an electric generator, and the second electrical bus is in electrical communication with a second battery and electric loads;
    an engine in mechanical communication with the electric generator such that torque produced by the engine or recuperated from vehicle kinetic energy is converted into electrical energy and supplied to the first electrical bus; and
    a controller in electrical communication with the DC/DC converter and configured to
        increase a magnitude of current received by the second electrical bus, resulting in a reduction in current received by the first battery, in response to a temperature of the first battery exceeding a predetermined temperature threshold, and
        increase a magnitude of electrical current flowing from the second electrical bus to the first electrical bus in response to an increase in vehicle energy demand.

2. The vehicle of claim 1, wherein the controller is further configured to increase the magnitude of current output to the second electrical bus in response to an amount of charge current received by the first battery exceeding a predetermined amount threshold.

3. The vehicle of claim 1, wherein the controller is further configured to increase the magnitude of current output to the second electrical bus in response to a predicted temperature of the first battery exceeding the predetermined temperature threshold.

4. The vehicle of claim 3, wherein the predicted temperature is based in part on the cooling capability of the cooling system.

5. The vehicle of claim 1, wherein the controller is further configured to decrease the magnitude in response to an amount of charge received by the second battery exceeding a predetermined amount threshold.

6. The vehicle of claim 1, wherein the predetermined temperature threshold is based on historical temperature data of the first battery.

7. The vehicle of claim 1, wherein the magnitude of current received by second electrical bus is partially dependent upon the remaining capacity of the second battery.

8. A vehicle comprising:
    a DC/DC converter configured to selectively permit flow of electrical current between a first electrical bus and a second electrical bus, wherein the first electrical bus is in electrical communication with a first battery and an electric motor, and the second electrical bus is in electrical communication with a second battery;
    a drivetrain in mechanical communication with the electric motor, such that electrical energy provided by the first electrical bus is converted into torque to propel the vehicle; and
    a controller in electrical communication with the DC/DC converter and configured to
        increase a magnitude of electrical current flowing from the second electrical bus to the first electrical bus, resulting in a reduction in current received from the first battery, in response to a temperature of the first battery exceeding a predetermined temperature threshold, and
        increase the magnitude of electrical current flowing from the second electrical bus to the first electrical bus in response to an increase in vehicle energy demand.

9. The vehicle of claim 8, wherein the controller is further configured to increase the magnitude of current output from the second electrical bus in response to an amount of discharge current discharged from the first battery exceeding a predetermined amount threshold.

10. The vehicle of claim 8, wherein the controller is further configured to increase the magnitude of current output from the second electrical bus in response to a predicted temperature of the first battery exceeding the predetermined temperature threshold.

11. The vehicle of claim 10, wherein the predicted temperature is based in part on the cooling capability of the cooling system.

12. The vehicle of claim 8, wherein the controller is further configured to decrease the magnitude in response to an amount of current received from the second battery exceeding a predetermined amount threshold.

13. The vehicle of claim 8, wherein the predetermined temperature threshold is based on historical temperature data of the first battery.

14. The vehicle of claim 8, wherein the magnitude of current received from the second electrical bus is partially dependent upon the remaining capacity of the second battery.

* * * * *